United States Patent
Swingley

(10) Patent No.: US 6,899,127 B1
(45) Date of Patent: May 31, 2005

(54) NON-VIBRATING BALL CHECK VALVE

(75) Inventor: Douglas Swingley, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 18 days.

(21) Appl. No.: 10/216,471

(22) Filed: Aug. 9, 2002

Related U.S. Application Data

(60) Provisional application No. 60/311,109, filed on Aug. 9, 2001.

(51) Int. Cl.[7] .............................................. F16K 15/04
(52) U.S. Cl. .............................. 137/533.11; 137/533.15
(58) Field of Search ...................... 137/533.11, 533.13, 137/533.15

(56) References Cited

U.S. PATENT DOCUMENTS

| | | | | |
|---|---|---|---|---|
| 544,376 A | * | 8/1895 | Porter | 137/533.11 |
| 1,091,980 A | * | 3/1914 | Steinberg | 137/533.15 |
| 1,555,934 A | * | 10/1925 | Barker | 137/533.11 |
| 1,935,978 A | * | 11/1933 | Harbison | 137/533.13 |
| 2,018,769 A | * | 10/1935 | Tryon | 137/533.11 |
| 2,103,427 A | * | 12/1937 | Long | 137/533.11 |
| 3,055,391 A | * | 9/1962 | Shuk et al. | 137/533.11 |
| 3,498,315 A | * | 3/1970 | Hester et al. | 137/533.11 |
| 4,070,237 A | * | 1/1978 | Woodward | 137/533.13 |
| 4,286,622 A | * | 9/1981 | Ninomiya et al. | 137/533.11 |
| 4,674,529 A | * | 6/1987 | Ferguson | 137/533.13 |
| 5,593,292 A | * | 1/1997 | Ivey | 137/533.15 |
| 6,280,166 B1 | * | 8/2001 | Shiraishi | 137/533.11 |

* cited by examiner

*Primary Examiner*—John Rivell
(74) *Attorney, Agent, or Firm*—Denton L. Anderson; Sheldon & Mak

(57) ABSTRACT

A ball check valve comprises a valve body chamber which includes an inlet opening, an outlet opening, and a ball that is free to travel within the valve body chamber. A valve seat is adapted for receiving the ball. A body clearance section is located downstream of the inlet opening. A bore section is located downstream of the body clearance section. Fluid flow is allowed to flow through the valve body from the inlet opening through the outlet opening, but fluid flow through the valve body from the outlet opening through the inlet opening is prohibited by the interaction of the ball and the valve seat. The inlet opening is smoothly contoured to urge fluid flow between the inlet opening and the outlet opening to be laminar in nature.

19 Claims, 2 Drawing Sheets

NON-VIBRATING BALL CHECK VALVE

RELATED APPLICATION

This invention is a continuation of U.S. Provisional Patent Application Ser. No. 60/311,109, filed Aug. 9, 2001 entitled "Non-Vibrating Ball Check Valve," the entirety of which is incorporated herein by this reference.

FIELD OF THE INVENTION

This invention relates generally to check valves and, more specifically, to ball check valves.

BACKGROUND OF THE INVENTION

Ball check valves are very popular types of check valves for use in liquid flow lines. The popularity of ball check valves stems from their relative simplicity of design and their relative inexpense of manufacture.

A problem, however, arises in the use of ball check valves regarding the fact that ball check valves have a tendency to rattle, as illustrated in FIG. 1. Such rattling stems from turbulence within the liquid flowing through the valve. Such turbulence causes the ball to rattle within the valve housing.

Several attempts have been made to minimize rattling within ball check valves. One such method is illustrated in FIG. 2. In this method, the clearance between the ball and the downstream portion of the valve body is substantially reduced. Such reduction in the clearance between the ball and the body of the valve causes additional friction between the fluid, the valve ball and the valve body. Such friction tends to drag the ball downstream and hold it firmly against the downstream end of the valve body. Although this method is relatively effective in minimizing rattle, it suffers from the disadvantage that the additional friction dissipates the kinetic energy of the flowing liquid, thereby increasing pressure drop across the valve.

A second method of reducing rattling in ball check valves is illustrated in FIG. 3. In this second method, the upstream portion of the valve body is considerably shortened. Thus, the incoming liquid impinges with enhanced force against the ball over a relatively short distance. The ball is thereby physically forced downstream up against the downstream end of the valve body. Unfortunately, this second method also results in a decrease in the kinetic energy of the liquid flowing through the valve and therefore also increases the pressure drop across the valve.

Accordingly, there is a need for a ball check valve which substantially minimizes rattling while avoiding the aforementioned problems in the prior art.

DRAWINGS

These features, aspects and advantages of the present invention will become better understood with regard to the following description, appended claims and accompanying figures where:

DETAILED DESCRIPTION

The invention is a ball check valve 10 which minimizes rattling by minimizing flow turbulence within the valve body 12. When such turbulence is minimized within the valve 10, flow within the valve 10 is smooth and does not cause the valve body 12 to rattle. The elimination of rattle within the valve body 12 is thereby achieved without any loss in kinetic energy of the fluid. Turbulence within the valve body 12 is minimized in the invention by constructing the ball check valve 10 in a very specific way as detailed below.

Figure 1:
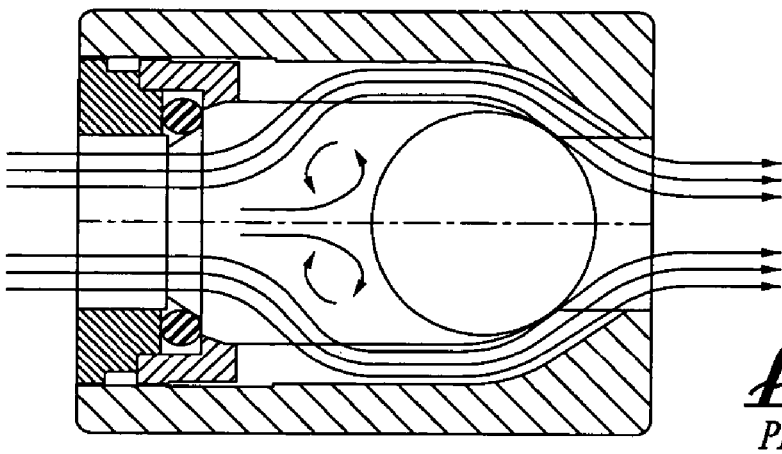
FIG. 1 is a cross-sectional side view of a ball check valve of the prior art.
Figure 2:
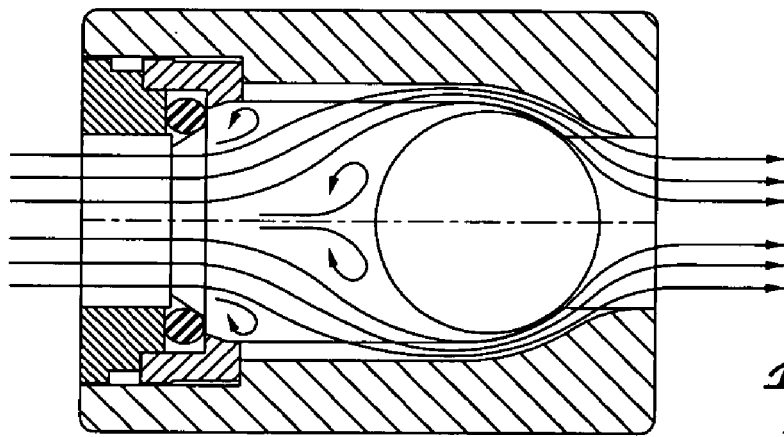
FIG. 2 is a cross-sectional side view of a second ball check valve of the prior art.
Figure 3:
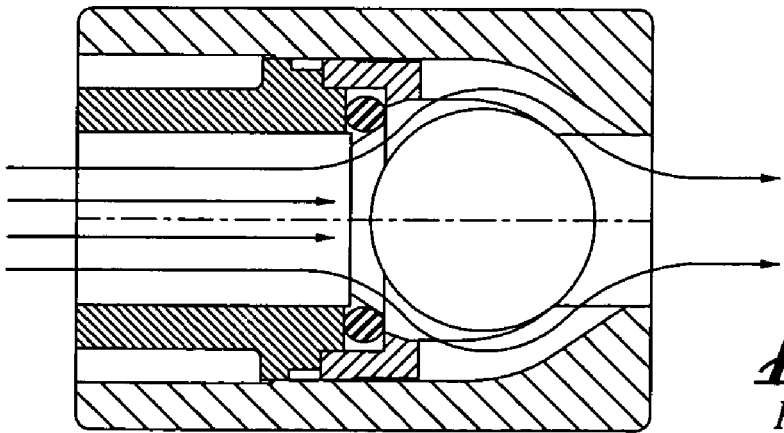
FIG. 3 is a cross-sectional side view of a third ball check valve of the prior art.
Figure 4:
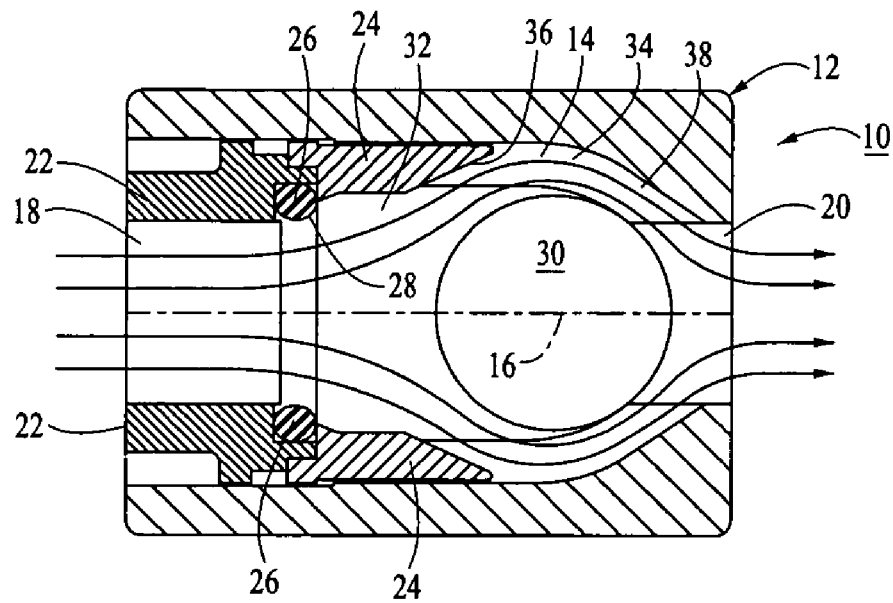
FIG. 4 is a cross-sectional view of a ball check valve having features of the invention.
Figure 5:
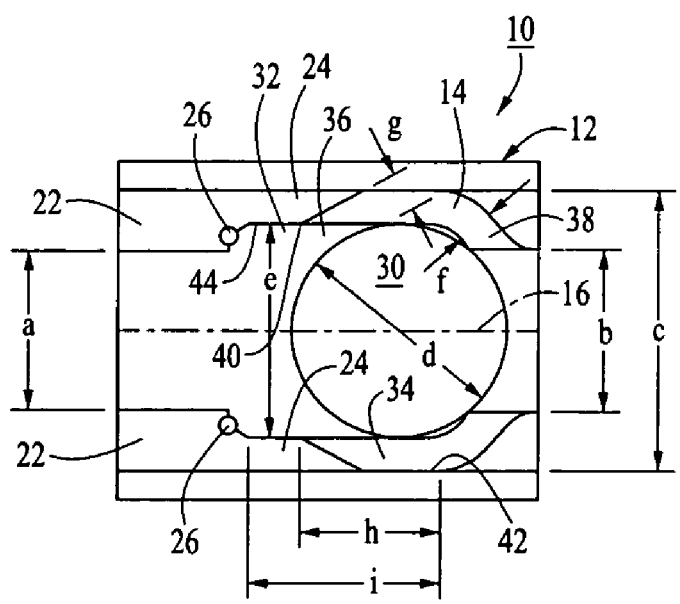
FIG. 5 is a schematic view of a ball check valve having features of the invention.

Referring to FIGS. 4 and 5, the ball check valve 10 of the invention has a hollow valve body 12 defining a valve body chamber 14 with a longitudinal axis 16. The valve body 12 has an inlet port 18 and an opposed outlet port 20. Within the valve body chamber 14 is an inner ring 22, a specially engineered flow plate 24 and an O-ring seal 26. The inner ring 22, the flow plate 24 and the seal 26 cooperate to provide a valve seat 28.

A valve ball 30 is also disposed within the valve body chamber 14. The valve ball 30 is free to travel between an upstream-most position and a downstream-most position. In the upstream-most position, the valve ball 30 is retained tightly against the valve seat 28 to prevent the reverse flow of liquid through the valve 10 the valve body chamber 14 includes a body clearance section 32 disposed immediately downstream of the inlet port 18. The valve body chamber 14 also includes a bore section 34 disposed immediately downstream of the body clearance section 32. The body clearance section 32 smoothly transitions to the bore section 34 via an upstream transition section 36. The bore section 34 smoothly transitions to the outlet port 20 via a downstream transition section 38. All cross-sections of the valve body chamber 14 perpendicular to the longitudinal axis 16 are circular.

The inlet port 18 has a diameter a. The outlet port 20 has a diameter b. The bore section 34 has a diameter c. The valve ball 30 has a diameter d. The body clearance section 32 has a diameter e. The clearance between the valve ball 30 and the downstream transition section 38 when the valve ball 30 is disposed in the downstream-most position is a distance f. The clearance between the valve ball 30 and the upstream transition section 36 when the valve ball 30 is in the downstream-most position is a distance g. The distance along the longitudinal axis 16 between the downstream end 40 of the body clearance section 32 and the downstream end 42 of the bore section 34 is h. The distance along the longitudinal axis 16 between the upstream end 44 of the body clearance section 32 and the downstream end 42 of the bore section 34 is i.

In the ball check valve 10 of the invention, the following relationships exist:

a=b;

c=1.46a+0.3125, plus or minus 2% d=1.19a+0.1089, plus or minus 5% e=$C_1$ d where $C_1$ is greater than 1.0, but less than or equal to 1.1 f=g, plus or minus 5% f=d÷7, plus or minus 20% h=$C_2$ $(f^2+g^2)^{1/2}$ where $C_2$ is greater than or equal to 2.25 but less than or equal to 2.75 i=$C_3$h, where $C_3$ is greater than or equal to 1.2 but less than or equal to 1.3

EXAMPLE

In a typical example of the invention, the interior diameter a of the inlet port 18 and the interior diameter b of the outlet port 20 are 1.5 inches. The bore section 34 of the valve body chamber 14 has a diameter c of 2.5 inches. The valve ball 30 has a diameter d of 1.89 inches. The valve body chamber 14 has a body clearance section 32 with a diameter e of 1.89 inches. The clearance f between the valve ball 30 and the downstream transition section 38 when the valve ball 30 is disposed in the downstream-most position is a distance of 0.27 inches. The clearance g between the valve ball 30 and the upstream transition section 36 when the valve ball 30 is in the downstream-most position is also 0.27 inches. The distance h along the longitudinal axis 16 of the valve body chamber 14 between the downstream end 40 of the body clearance section 32 and the downstream end 42 of the bore section 34 is 0.859 inches. The distance i along the longitudinal axis 16 of the valve chamber 14 between the upstream end 44 of the body clearance section 32 and the downstream end 42 of the bore section 34 is 1.03.

In this example, the valve 10 is made from polyvinyl chloride, but other plastics and/or metals can also be used. The O-ring is made from a rubber material, but other resilient materials can also be used.

The ball check valve 10 is capable of handling a wide range of flow rates without rattling and with minimum pressure drop across the valve 10.

Having thus described the invention, it should be apparent that numerous structural modifications and adaptations may be resorted to without departing from the scope and fair meaning of the instant invention as set forth hereinabove.

What is claimed is:

1. A ball check valve comprising:
   (a) a valve body, the valve body defining a valve body chamber having an inlet opening, an outlet opening and a longitudinal axis;
   (b) a ball disposed within the valve body chamber between the inlet opening and the outlet opening, the valve ball being free to travel between an upstream-most position and a downstream-most position;
   (c) a valve seat disposed within the valve body, the valve seat adapted for receiving the ball;
   (d) a body clearance section defined within the valve body chamber downstream of the inlet opening; and
   (e) a bore section defined within the valve body chamber downstream of the body clearance section;
   wherein the valve body, the ball, the valve seat, the body clearance section and the bore section cooperate so that fluid flow is allowed to flow through the valve body from the inlet opening through the outlet opening, but fluid flow through the valve body from the outlet opening through the inlet opening is prohibited by the interaction of the ball and the valve seat,
   wherein the body clearance section smoothly transitions to the bore section via an upstream transition section;
   wherein the bore section smoothly transitions to the outlet opening via a downstream transition section; and
   wherein the distance i along the longitudinal axis between the upstream end of the body clearance section and the downstream end of the bore section is between about 1.2 h and about 1.3 h, h being the distance along the longitudinal axis between the downstream end of the body clearance section and the downstream end of the bore section.

2. A ball check valve according to claim 1 wherein the valve seat comprises an inner ring, a flow plate and an O-ring seal.

3. A ball check valve according to claim 1 wherein the diameter a of the inlet opening is essentially equal to the diameter b of the outlet opening.

4. A ball check valve according to claim 1 wherein the diameter c of the bore section is between about 1.431 a+0.306 and about 1.49 a+0.319, a being the diameter of the inlet opening.

5. A ball check valve according to claim 1 wherein the diameter d of the valve ball is between about 1.1305 a+0.1034 and about 1.249 a+0.1143, a being the diameter of the inlet opening.

6. A ball check valve according to claim 1 wherein the diameter e of the body clearance section is between about d and about 1.1 d, d being the diameter of the valve ball.

7. A ball check valve according to claim 1 wherein the distance f between the valve ball and the downstream transition section when the valve ball is disposed in the downstream-most position is between about 0.1143 a and about 0.1714 a, a being the diameter of the inlet opening.

8. A ball check valve according to claim 1 wherein the distance g between the valve ball and the upstream transition section when the valve ball is disposed in the downstream-most position is between about 0.95 f and about 1.05 f, f being the distance between the valve ball and the downstream transition section when the valve ball is disposed in the downstream-most position.

9. A ball check valve according to claim 1 wherein the distance h along the longitudinal axis between the downstream end of the body clearance section and the downstream end of the bore section is between about 2.25 $(f^2+g^2)^{1/2}$ and about 2.75 $(f^2+g^2)^{1/2}$, f being the distance between the valve ball and the downstream transition section when the valve ball is disposed in the downstream-most position and a being the distance between the valve body and the upstream transition section when the valve ball is disposed in the downstream-most position.

10. A ball check valve according to claim 1 wherein the inlet opening is smoothly contoured to urge fluid flow between the inlet opening and the outlet opening to be laminar in nature.

11. A ball check valve comprising:
    (a) a valve body, the valve body defining a valve body chamber having an inlet opening, an outlet opening and a longitudinal axis;
    (b) a ball disposed within the valve body chamber between the inlet opening and the outlet opening, the valve ball being free to travel between an upstream-most position and a downstream-most position;
    (c) a valve seat disposed within the valve body, the valve seat adapted for receiving the ball;
    (d) a body clearance section defined within the valve body chamber downstream of the inlet opening; and
    (e) a bore section defined within the valve body chamber downstream of the body clearance section;
    wherein the valve body, the ball, the valve seat, the body clearance section and the bore section cooperate so that fluid flow is allowed to flow through the valve body from the inlet opening through the outlet opening, but fluid flow through the valve body from the outlet opening through the inlet opening is prohibited by the interaction of the ball and the valve seat, wherein the body clearance section smoothly transitions to the bore section via an upstream transition section;

wherein the bore section smoothly transitions to the outlet opening via a downstream transition section; and wherein the distance h along the longitudinal axis between the downstream end of the body clearance section and the downstream end of the bore section is between about 2.75 $(f^2+g^2)^{1/2}$, f being the distance between the valve ball and the downstream transition section when the valve ball is disposed in the downstream-most position and g being the distance between the valve body and the upstream transition section when the valve ball is disposed in the downstream-most position.

12. A ball check valve according to claim 11 wherein the valve seat comprises an inner ring, a flow plate, and an O-ring seal.

13. A ball check valve according to claim 11 wherein the diameter a of the inlet opening is essentially equal to the diameter b of the outlet opening.

14. A ball check valve according to claim 11 wherein the diameter c of the bore section is between about 1.431 a+0.306 and about 1.49 a+0.319, a being the diameter of the inlet opening.

15. A ball check valve according to claim 11 wherein the diameter d of the valve ball is between about 1.1305 a+0.1034 and about 1.249 a+0.1143, a being the diameter of the inlet opening.

16. A ball check valve according to claim 11 wherein the diameter e of the body clearance section is between about d and about 1.1, d being the diameter of the valve ball.

17. A ball check valve according to claim 11 wherein the distance f between the valve ball and the downstream transition section when the valve ball is disposed in the downstream-most position is between about 0.1143 a and about 0.1714 a, a being the diameter of the inlet opening.

18. A ball check valve according to claim 11 wherein the distance g between the valve ball and the upstream transition section when the valve ball is disposed in the downstream-most position is between about 0.95 f and about 1.05 f, f being the distance between the valve ball and the downstream transition section when the valve ball is disposed in the downstream-most position.

19. A ball check valve according to claim 11 wherein the inlet opening is smoothly contoured to urge fluid flow between the inlet opening and the outlet opening to be laminar in nature.

* * * * *